(12) United States Patent
Krishnamoorthy et al.

(10) Patent No.: US 8,520,415 B1
(45) Date of Patent: Aug. 27, 2013

(54) MULTI-FUNCTION FEEDBACK USING AN OPTOCOUPLER

(75) Inventors: Ravishanker Krishnamoorthy, Singapore (SG); Hong Liang Zhang, Singapore (SG); Wanfeng Zhang, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 535 days.

(21) Appl. No.: 12/579,928

(22) Filed: Oct. 15, 2009

Related U.S. Application Data

(60) Provisional application No. 61/114,156, filed on Nov. 13, 2008.

(51) Int. Cl.
*H02M 3/335* (2006.01)

(52) U.S. Cl.
USPC .............. 363/21.15; 363/21.07; 363/21.17; 363/56.03

(58) Field of Classification Search
USPC .......... 363/21.04, 21.07, 21.09, 21.12, 21.15, 363/21.17, 56.03, 95, 131
See application file for complete search history.

(56) References Cited

U.S. PATENT DOCUMENTS

| | | | | |
|---|---|---|---|---|
| 5,349,523 A * | 9/1994 | Inou et al. | ....................... | 363/97 |
| 6,088,244 A * | 7/2000 | Shioya et al. | .............. | 363/21.07 |
| 6,301,133 B1 * | 10/2001 | Cuadra et al. | ................... | 363/65 |
| 6,639,812 B2 * | 10/2003 | Nakazawa et al. | ......... | 363/21.07 |
| 6,894,882 B2 * | 5/2005 | Maru et al. | .................... | 361/91.1 |
| 6,980,443 B2 * | 12/2005 | Nagano et al. | ............. | 363/21.12 |
| 7,138,731 B2 * | 11/2006 | Weinmeier et al. | ............. | 307/83 |
| 8,040,699 B2 * | 10/2011 | Huynh et al. | ............... | 363/21.15 |

* cited by examiner

*Primary Examiner* — Adolf Berhane
*Assistant Examiner* — Fred E Finch, III

(57) ABSTRACT

Some of the embodiments of the present disclosure provide an apparatus comprising a voltage sensor circuit configured to generate a voltage feedback signal indicative of an output voltage of the apparatus, a current sensor circuit configured to generate a current feedback signal indicative of a load current of the apparatus, a converter configured to receive the current feedback signal, and generate a fault signal that is indicative of a fault condition associated with the load current, and an optocoupler configured to receive the voltage feedback signal and the fault signal, and generate a feedback signal that is indicative of the output voltage and indicative of the fault condition. Other embodiments are also described and claimed.

16 Claims, 7 Drawing Sheets

MULTI-FUNCTION FEEDBACK USING AN OPTOCOUPLER

CROSS REFERENCE TO RELATED APPLICATIONS

The present application claims priority to U.S. Patent Application No. 61/114,156, filed Nov. 13, 2008, the entire specification of which is hereby incorporated by reference in its entirety for all purposes, except for those sections, if any, that are inconsistent with this specification.

TECHNICAL FIELD

Embodiments of the present invention relate to feedback using optocouplers, and more specifically to multi-function feedback using an optocoupler.

BACKGROUND

FIG. 1a schematically illustrates a conventional alternating current (AC)-direct current (DC) conversion system 100a employing an optocoupler 144 for voltage feedback. The system 100a includes a full bridge rectifier 108 receiving an AC input, and configured to output a pulsed DC signal that is operatively coupled to a primary side 116 of a transformer 112 (e.g., a flyback transfer). A secondary side 120 of the transformer 112 is operatively coupled to a diode 124, which outputs a DC voltage Vout.

The DC output Vout is controlled by controlling an operation of the transformer 112. The transformer 112 is controlled by controlling a switching of a MOSFET 138 that is operatively coupled between the primary side 116 of the transformer 112 and ground GND 1. For example, when the MOSFET 138 is turned on, energy is stored in the primary side coil of the transformer 112, whereas when the MOSFET 138 is turned off, the stored energy is transferred to the secondary side coil of the transformer 112, which is then rectified by the diode 124. The switching of the MOSFET 138 is controlled by a controller 130. The controller 130 includes a voltage feedback module 146 configured to receive a feedback of the output voltage Vout through a voltage sensor 140 and the optocoupler 144. The voltage feedback module 146, using the feedback received from the optocoupler 144, controls the switching of the MOSFET 138. During operation, the controller 130 regulates the output voltage Vout such that Vout tracks a reference voltage Vref.

The ground GND 1 is usually not a true earth ground (e.g., ground GND 1 may be a virtual ground, as GND 1 sees AC voltage during one half of each AC cycle), whereas a ground GND 2 (on the secondary side 120 of the transformer 112) may be a true earth ground. For this and other operational reasons (e.g., safety reasons), it may be desired to electrically isolate the primary side 116 and the secondary side 120. The optocoupler 144 couples the primary side 116 and the secondary side 120 using light (e.g., using light from a light emitting diode (LED) included in the optocoupler 144), but does not electrically connect the primary side 116 and the secondary side 120. Thus, the optocoupler 144 provides electrical isolation in the voltage feedback loop, i.e., provides electrical isolation between the controller 130 (coupled to the primary side 116) and the voltage Vout (in the secondary side 120 of the transformer 112).

FIG. 1b schematically illustrates a conventional voltage feedback system 100b that may be used in the AC-DC conversion system 100a of FIG. 1. More specifically, FIG. 1b illustrates the voltage sensor 140 and the optocoupler 144 of FIG. 1a in more detail. As shown in FIG. 1b, the voltage sensor 140 includes an operational amplifier 140a and a capacitor 140b forming a simple integrator circuit. The voltage sensor 140 outputs an error signal Verror that is a function of a difference between the output voltage Vout and the reference voltage Vref (i.e., Vout−Vref). The optocoupler 144, which is operatively coupled to the voltage sensor 140, includes an LED 144a optically coupled to a photodetector 144b. The optocoupler 144 outputs a feedback signal that is proportional to the input to the optocoupler (Vout−Vref). Thus, the feedback signal is a function of (Vout−Vref), and the feedback signal is used by the voltage feedback module 146 to control the switching of the MOSFET 138.

FIG. 1c schematically illustrates a conventional AC-DC conversion system 100c employing a first optocoupler 144 for voltage feedback and a second optocoupler 154 for current feedback. Several components of the system 100c are similar to the corresponding components of system 100a, and are identified by the same identification labels in FIGS. 1a and 1c. In addition to the components identified in FIG. 1a, the system 100c of FIG. 1c also includes a current sensor 150 configured to measure a load current in the secondary side 120 of the transformer 112, and a second optocoupler 154 operatively coupled to the current sensor 150. The current sensor 150 and the optocoupler 154 are configured to provide feedback of the secondary side load current to a current feedback module 156 included in the controller 130. Similar to the optocoupler 144, the optocoupler 154 provides electric isolation between the primary and secondary sides of the transformer 112 in the current feedback loop.

In case a fault occurs in the secondary side 120 of the transformer 112 (e.g., short circuit or overloading on the secondary side 120), the secondary side load current usually increases (e.g., is several times the usual or normal secondary side load current). This increase in the load current is sensed by the current sensor 150, and transmitted to the current feedback module 156 in the controller 130 through the optocoupler 154. Upon detecting such a fault condition, the current feedback module 156 controls the MOSFET 138 to switch off the transformer 112, thereby preventing the transformer 112 from transferring energy from the primary side 116 to the secondary side 120 until the fault condition is cleared.

Thus, two different optocouplers (e.g., optocouplers 144 and 154) are used to feedback voltage and current sensing signals from the secondary side 120 to the primary side 116, and provide electrical isolation in the voltage and current feedback loop (i.e., provide electrical isolation between the primary side 116 and secondary side 120 of the transformer 112).

SUMMARY

In various embodiments, the present disclosure provides an apparatus comprising an optocoupler configured to receive a voltage feedback signal and a fault signal, and generate a feedback signal that is indicative of an output voltage of the apparatus and indicative of a fault condition of the apparatus. There is also provided, in accordance with various embodiments of the present disclosure, a method comprising generating a voltage feedback signal indicative of an output voltage of an alternating current (AC) to direct current (DC) converter, generating a current feedback signal indicative of a load current of the converter, generating a fault signal based at least in part on the generated current signal, the fault signal being indicative of occurrence of a fault condition associated with the load current, receiving, by an optocoupler, the voltage feedback signal and the fault signal, and generating, by the optocoupler, a feedback signal based at least in part on the received voltage feedback signal and the fault signal. There is also provided, in accordance with various embodiments of the present disclosure, an alternating current (AC) to direct current (DC) converter comprising a transformer comprising a primary side coil and a secondary side coil, and an optocoupler configured to receive an input signal that is indicative of an output voltage of the transformer and is indicative of an occurrence of a fault associated with a over-current condition in one or more components operatively coupled to the secondary side coil, wherein the optocoupler is further configured to output a feedback signal that is a function of the input signal.

BRIEF DESCRIPTION OF THE DRAWINGS

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

FIG. 2b schematically illustrates an exemplary voltage and current feedback system that may be employed in the AC-DC conversion system of FIG. 2a.

DETAILED DESCRIPTION

In the following detailed description, reference is made to the accompanying drawings which form a part hereof wherein like numerals designate like parts throughout, and in which various embodiments are shown. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase at least one of A, B and C" means (A), (B), (C), (A and B), (A and C), (B and C) or (A, B and C). The phrase "(A) B" means (B) or (A and B), that is, A is optional.

Figure 1A:
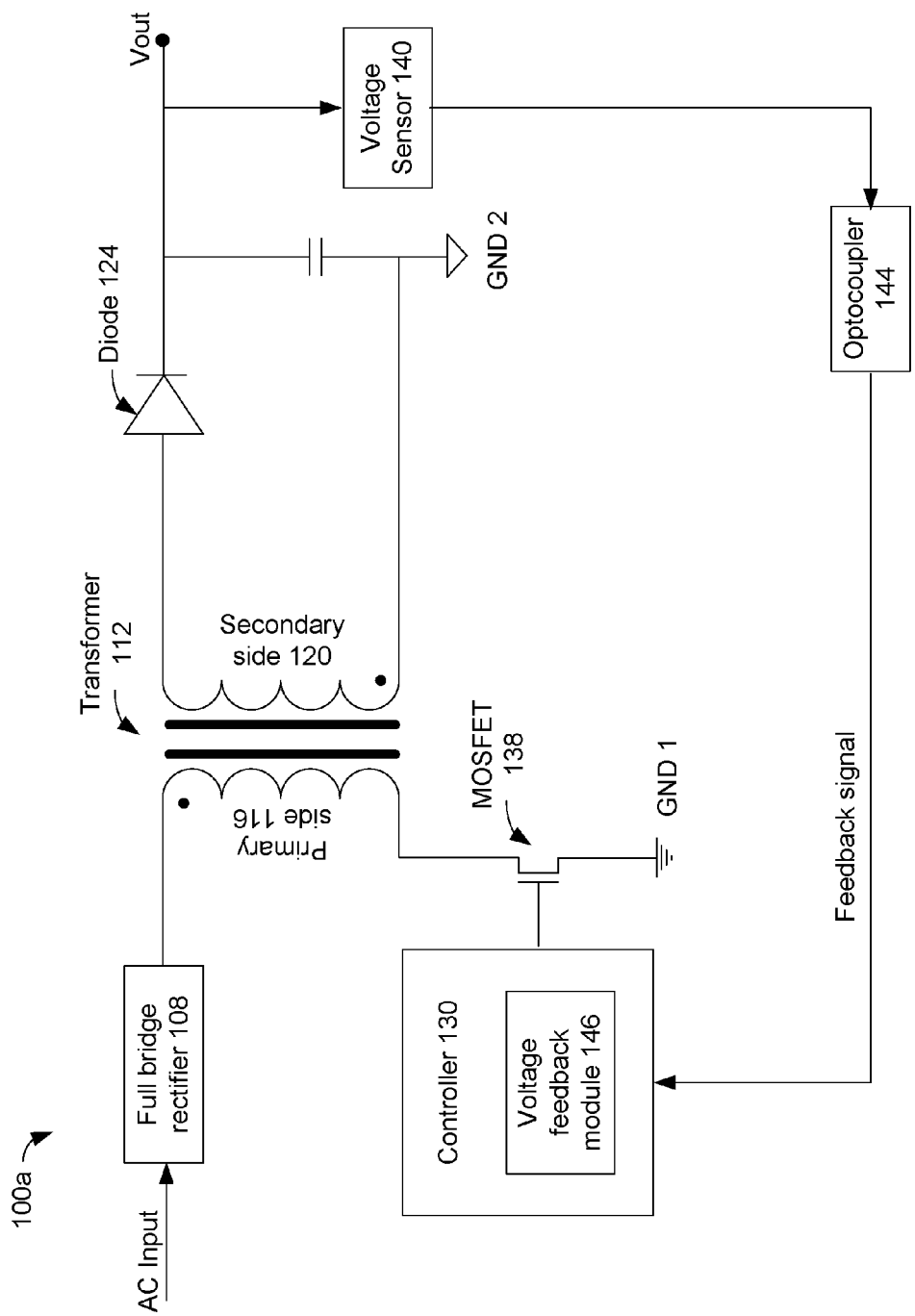
FIG. 1a schematically illustrates an exemplary alternating current (AC)-direct current (DC) conversion system employing an optocoupler for voltage feedback.
Figure 1B:
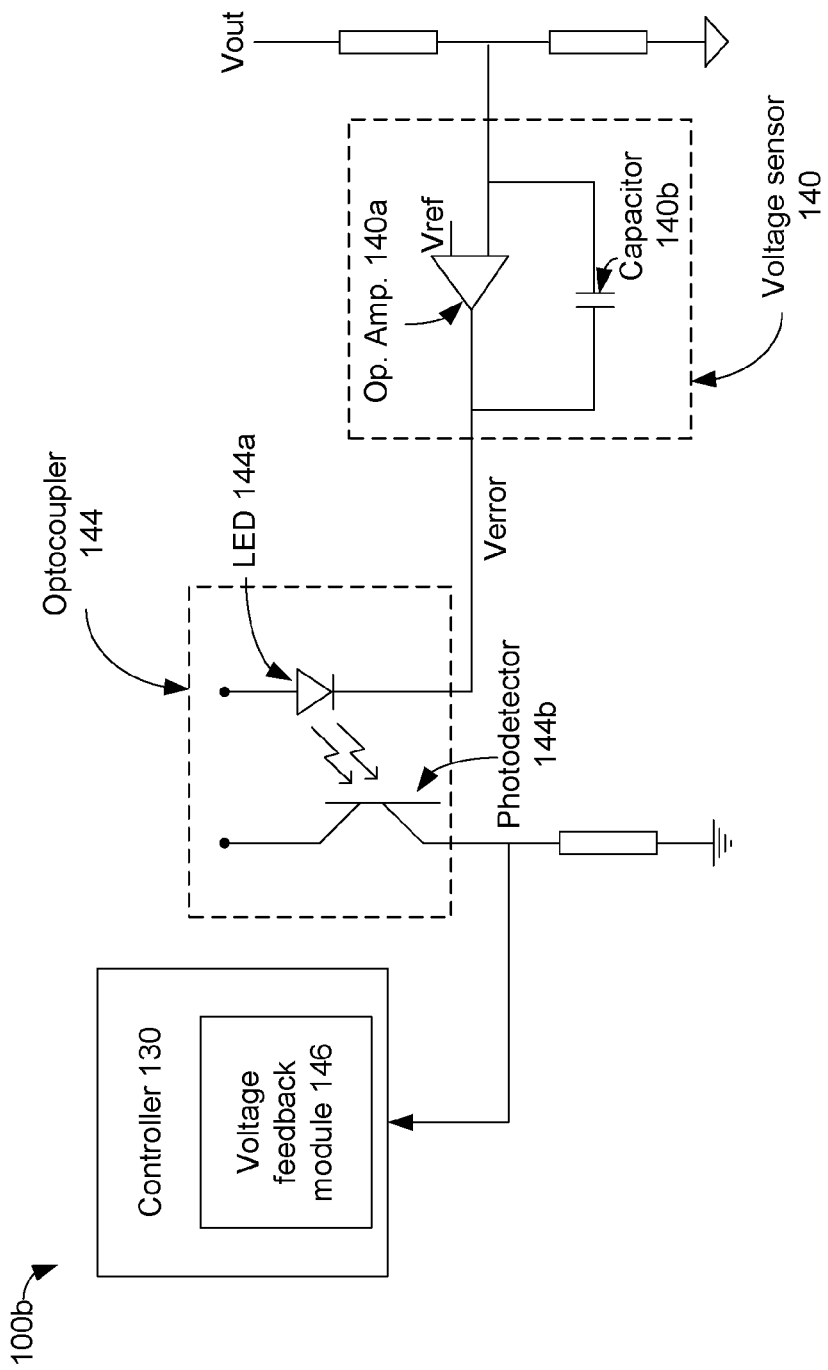
FIG. 1b schematically illustrates a voltage feedback system that may be used in the AC-DC conversion system of FIG. 1.
Figure 1C:
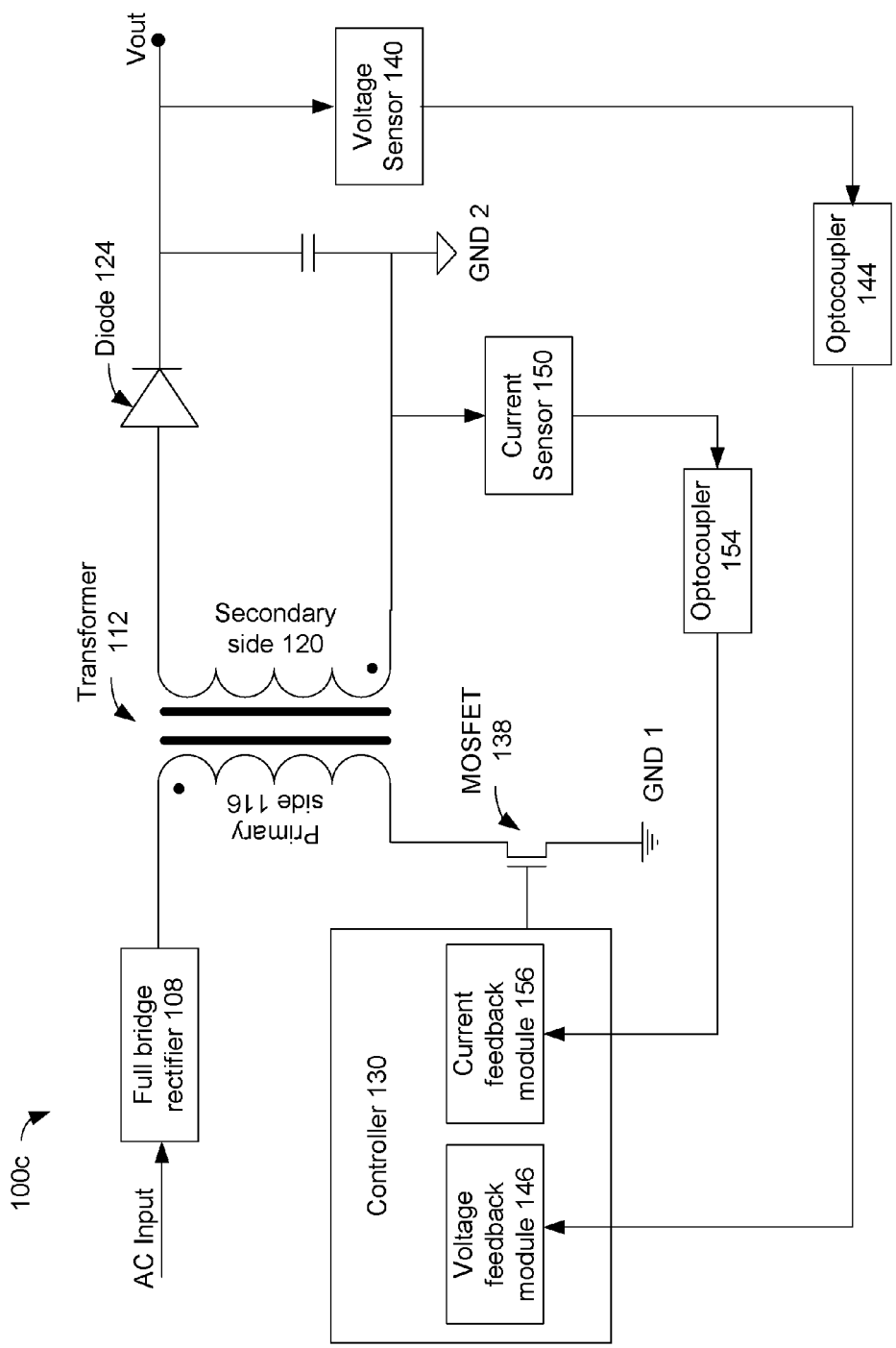
FIG. 1c schematically illustrates an exemplary AC-DC conversion system employing a first optocoupler for voltage feedback and a second optocoupler for current feedback.
Figure 2A:
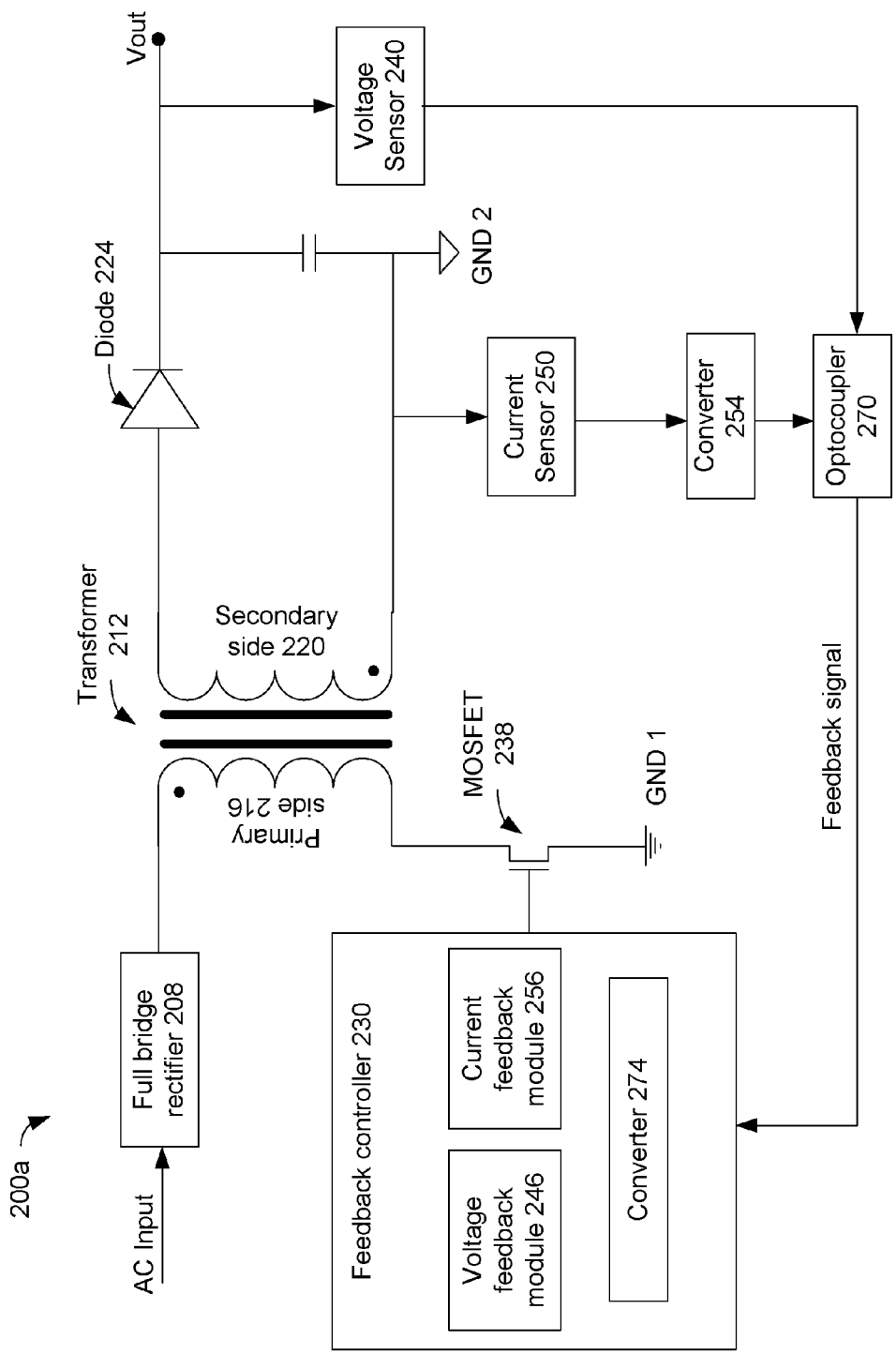
FIG. 2a schematically illustrates an exemplary AC-DC conversion system employing an optocoupler for voltage feedback and for current feedback.

FIG. 2a schematically illustrates an exemplary AC-DC conversion system 200a employing an optocoupler 270 for voltage feedback and for current feedback. One or more components of the system 200a may be at least in part similar to the corresponding components of systems 100a and 100c of FIGS. 1a and 1c. For example, the full bridge rectifier 208, the transformer (e.g., a flyback transfer) 212, including the primary side 216 and the secondary side 220 of the transformer 212, the MOSFET 238, and/or the voltage sensor 240 of FIG. 2a may be at least in part similar to the corresponding components in FIGS. 1a and/or 1c.

The MOSFET 238 of FIG. 2a is controlled by a feedback controller 230. The feedback controller 230 includes a voltage feedback module 246, a current feedback module 256 and a converter 274. The system 200a of FIG. 2a also includes a current sensor 250 operatively coupled to a converter 254. The current sensor 250 is configured to measure or sense a current (e.g., a load current) of the secondary side 220, and the converter 254 is configured to convert the sensed current into a fault signal, as will be discussed in more detail herein. The output of the converter 254 and the output of the voltage sensor 240 are coupled to an optocoupler 270. That is, the optocoupler 270 receives inputs from both the current sensor 250 (through converter 254) and the voltage sensor 240. An output of the optocoupler 270 is operatively coupled to the feedback controller 230. Thus, the feedback controller 230 receives feedback of the output voltage Vout as well as the secondary side load current (hereinafter referred as load current) from the optocoupler 270, and controls the switching of the MOSFET 238 based on the received feedback.

The voltage feedback received by the feedback controller 230 can be used by the feedback controller 230 (e.g., by the voltage feedback module 246) to control MOSFET 238 such that the output voltage Vout tracks a reference voltage Vref. Also, the current feedback received by the feedback controller 230 (e.g., by the current feedback module 256) can be used to protect the system 200a in case of a fault.

For the purpose of this disclosure and unless mentioned otherwise, a fault may refer to an usual condition arising in the secondary side 220 of the transformer 212, which may result in an increase in the load current (e.g., increase of several times than the usual, normal or nominal range of secondary side load current). Such an unusual condition may arise due to a variety of reasons, e.g., due to a short circuit and/or overloading in one or more components (e.g., diode 224, a load operatively coupled to the secondary side 220, etc.) associated with the secondary side 220.

One or more components of FIG. 2a may be replaced by one or more other components of similar functionality. For example, although a single MOSFET 238 is illustrated to control the switching of the transformer 212, any other switching circuit (e.g., employing any number of MOSFETs, other types of transistors or switching devices, or the like) may be used to control the transformer 212. In another example, instead of (or in addition to) using a full bridge rectifier 208, any other rectifier circuit (e.g., a half wave rectifier) may be employed to rectify the received AC input.

Similarly, instead of using a diode 224 to rectify the output of the transformer 212, any other rectifier circuit may also be used. The current sensor 250 and the voltage sensor 240 may be of any appropriate type that may be configured to measure the load current and the output voltage Vout, respectively.

Figure 2B:
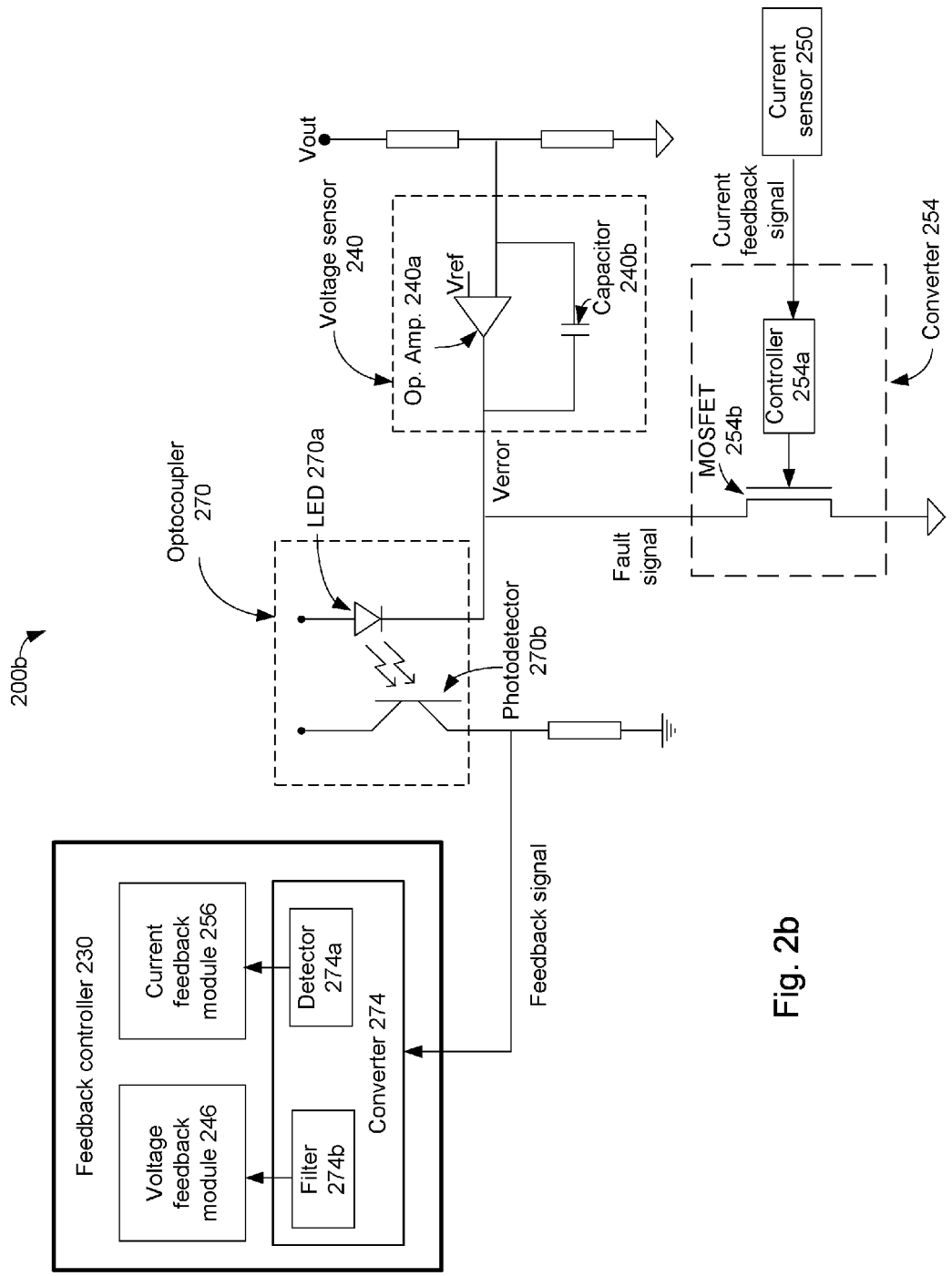

FIG. 2b schematically illustrates an exemplary voltage and current feedback system 200b that may be employed in the AC-DC conversion system 200a of FIG. 2a. More specifically, FIG. 2b illustrates the voltage sensor 240, the converter 254, and the optocoupler 270 of FIG. 2a in more details. The voltage sensor 240 includes an operational amplifier 240a and a capacitor 240b forming a simple integrator circuit. The voltage sensor 240 outputs an error signal Verror that is a function of a difference between the output voltage Vout and a reference voltage Vref. The output of the voltage sensor 240 is coupled to an input of the optocoupler 270.

FIG. 2b also illustrates the current sensor 250 operatively coupled to the converter 254. The current sensor 250 is configured to output a current signal indicative of the load current of FIG. 2a. The converter 254 receives the current signal and outputs a fault signal, which is coupled to the input of the optocoupler 270. The converter 254 includes a controller 254a configured to control a MOSFET 254b. The fault signal is indicative of one or more fault conditions associated with the load current, as will be discussed in more detail herein.

The optocoupler 270 includes an LED 270a optically coupled to a photodetector 270b (e.g., a photo diode). The optocoupler 270 outputs a feedback signal that is indicative of the signal Verror and of the fault signal, which is used by the feedback controller 230 to control the switching of the MOSFET 238.

The feedback controller 230 includes a converter 274 having a filter 274b (operatively coupled to the voltage feedback module 246) and a detector 274a (operatively coupled to the current feedback module 256), as will be discussed in more detail herein.

As previously discussed, the voltage feedback received by the feedback controller 230 (e.g., by the voltage feedback module 246) is used to control the MOSFET 238 such that the output voltage Vout tracks the reference voltage Vref. Also, the current feedback received by the feedback controller 230 (e.g., by the current feedback module 256) is used to protect the system 200a in case of a fault. Controlling the switching of the MOSFET 238 using the voltage feedback, to ensure that the Vout tracks Vref, is a continuous process. That is, the feedback controller 230 almost continuously (or periodically, or intermittently) receives and uses the voltage feedback signal from the voltage sensor 240 (via the optocoupler 270), and controls the switching of the MOSFET 238 based on the voltage feedback signal. However, the fault signal, which indicates one or more faults, is relatively infrequent (as faults may usually occur relatively infrequently), and is used by the feedback controller 230 (e.g., by the current feedback module 256) only when one or more fault conditions arise.

In an embodiment, the fault signal includes two states: a no-fault state and a fault state. For example, during regular or normal operation (e.g., in the absence of a fault) of the system 200a of FIG. 2a, the controller 254a determines that the load current sensed by the current sensor 250 is within a normal, nominal or regular operating current range. During this time, the fault signal is at a no-fault state (e.g., the fault signal is not asserted, the fault signal is at a low state, or the like, as will be discussed in more detail herein).

However, there may be situations when there is a short circuit or overloading in the secondary side 220 (i.e., there may be one or more faults in the secondary side 220). During occurrence of such a fault, the secondary side load current increases (e.g., increases above a threshold current value). Upon sensing such an increase in current by the current sensor 250, the controller 254a determines an occurrence of a fault. Accordingly, the controller 254a changes the state of the fault signal from a no-fault state to a fault state (e.g., the fault signal is asserted, is at a high state, is alternating between a high and low state, or the like, as will be discussed in more detail herein). Thus, the fault signal is indicative of one or more fault conditions associated with the load current.

The controller 254a may take into account various factors while entering in the fault state, e.g., increase of the load current above a threshold current value, a duration of time during which the load current is high than the threshold current value, rate of increase of the load current, normal or regular operating range of the load current, and/or the like.

FIGS. 3a-3d illustrate various exemplary values of the input signal to the optocoupler 270 of FIGS. 2a and/or 2b. In each of the FIGS. 3a to 3d, the system 200a (and/or system 200b) operates normally (e.g., without occurrence of a fault) between time t0 and t1. That is, the fault signal is in the no-fault state during time t0 to t1. A fault is developed in the secondary side 220 of the system 200a at time t1, resulting in an increase in the load current. The current sensor 250 senses the increase in the load current, and the converter 254 asserts the fault signal (e.g., the fault signal enters from the no-fault state to the fault state) from time t1 in each of the FIGS. 3a-3d.

In each of FIGS. 3a-3d, the Verror signal is between 0-5 volts (V), and the input to the optocoupler 270 varies between 0 V to 5 V during time t0 to t1 (while the fault signal is at the no-fault state, i.e., is not asserted) based on variation in the output voltage Vout. At time t1 (i.e., when a fault occurs), sensing an increase in load current, the converter 254 asserts the fault signal (e.g., change the state of the fault signal from the no-fault state to the fault state).

Figure 3A:
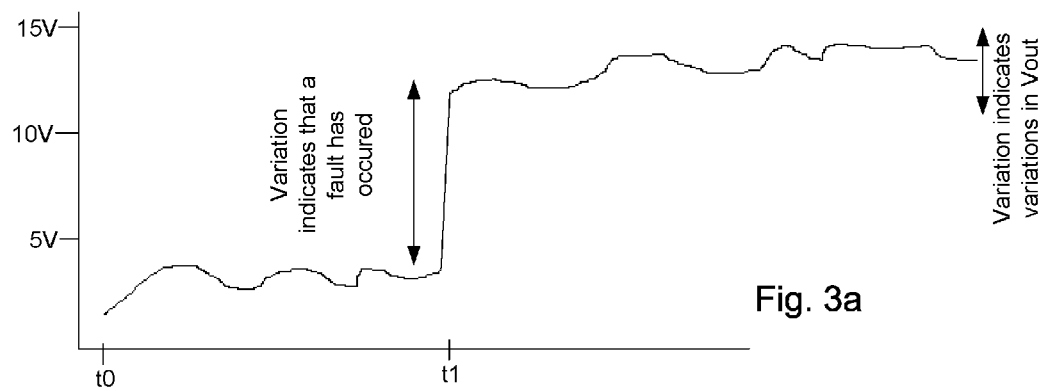
FIGS. 3a-3d illustrate various exemplary values of the input signal to the optocoupler of FIGS. 2a and 2b.

Now, referring specifically to FIG. 3a, during the no-fault state (i.e., during time t0 to t1), the fault signal is not asserted, and the input to the optocoupler 270 is simply the variations in the Verror signal due to variations in the output voltage Vout. That is, during time t0 to t1, the fault signal does not contribute to or affect the input to the optocoupler 270. From time t1, detecting the increase in load current sensed by the current sensor 250 due to one or more faults, the fault signal state changes from no-fault state to fault state. As a result, the converter 254 pulls up the fault signal such that the input to the optocoupler varies between 10-15 V (because of the variations in the Verror signal). Thus, the increased magnitude of the input to the optocoupler 270 from time t1 indicates that the fault has occurred at time t1. The feedback signal (i.e., the output of optocoupler 270) also reflects this increase. The feedback controller 230 (e.g., the detector 274a of FIG. 2b) detects this sudden increase in the feedback signal from time t1, and the current feedback module 256 determines the occurrence of the fault from time t1. Also, the filter 274b filters out the fault signal from the feedback signal, to output a signal that is primarily associated with the variations of the output voltage Vout. The voltage feedback module 246 uses this filtered feedback signal to control the MOSFET 238 and regulate the output voltage Vout such that Vout tracks the reference voltage Vref.

Figure 3B:
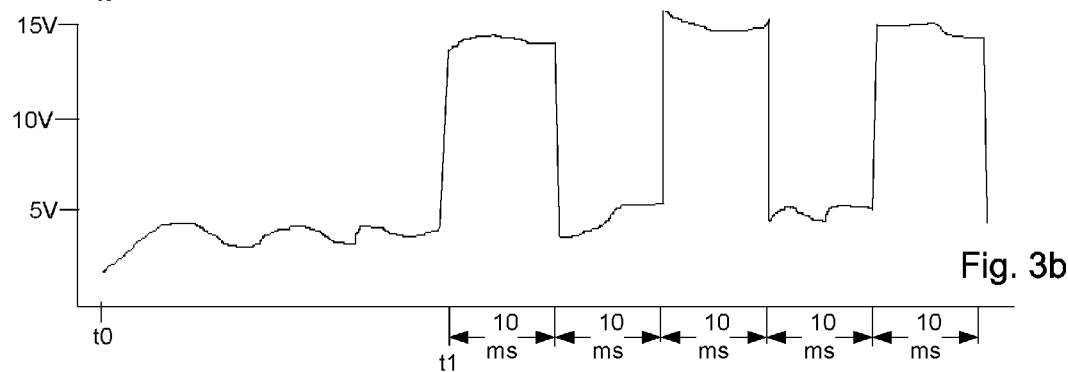

FIG. 3b illustrates another exemplary way of varying the fault signal when a fault occurs. Referring to FIG. 3b, during the no-fault state (i.e., during time t0 to t1), the fault signal is not asserted, and the input to the optocoupler 270 is simply the variations in the Verror signal due to variations in the output voltage Vout. From time t1, to indicate the fault condition, the converter 250 pulls up the fault signal for a certain duration of time (e.g., 10 millisecond (ms)) such that the input to the optocoupler 270 varies between 10-15 V (because of variations in the Verror signal), and then pulls down the fault signal for 10 ms such that the input to the optocoupler varies between 0-5 V (because of the variations in Verror). That is, the converter 250 periodically varies the average amplitude of the input to the optocoupler 270 in a form of a square wave. This cyclical nature of the input signal to the optocoupler 270 conveys to the feedback controller 230 about the occurrence of the fault from time t1, while the variation of the input signal during each square wave cycle conveys the variation in the output voltage Vout. In an embodiment, the detector 274a detects this periodic variation in the feedback signal from time t1, and the current feedback module 256 determines the fault condition from time t1. Also, the filter 274b filters out the fault signal, and outputs variations in the feedback signal due to the variations in the output voltage Vout.

Figure 3C:
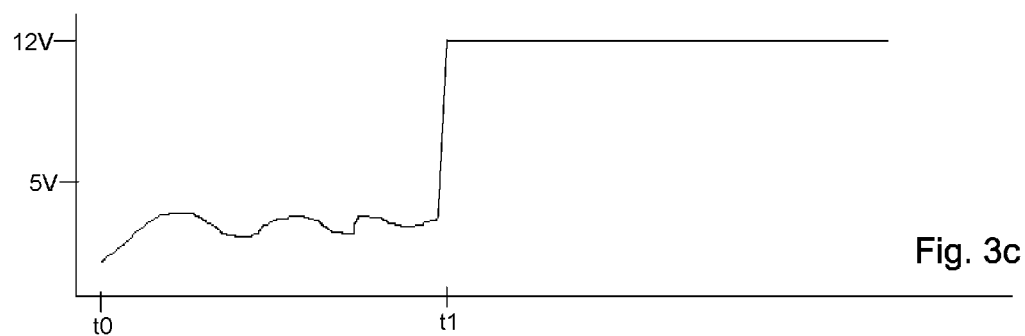

The fault signal may be varied in a number of other ways as well to enable the feedback controller 230 to detect the fault condition. For example, as illustrated in FIG. 3c, upon occurrence of a fault at time t1, the input to the optocoupler 270 may be maintained at a constant voltage (e.g., 12 V) by the converter 254, which may be detected by the detector 274a and the current feedback module 256 to determine the occurrence of the fault.

Figure 3D:
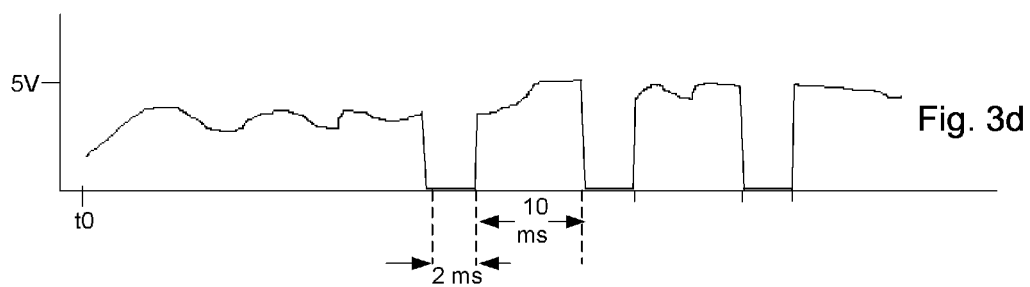

In another example and referring to FIG. 3d, upon detecting the fault, the converter 254 pulls down the input to the optocoupler to a certain value (e.g., 0 V in FIG. 3d) for a short duration of time (e.g., 2 ms), then allows the input to be same as the Verror signal for a relatively longer duration of time (e.g., 10 ms), and repeats this sequence periodically. The detector 274a detects this periodic sequence, and determines the occurrence of the fault. In an embodiment, the voltage control loop is slower compared to the current feedback loop, and the short pulses during which the voltage signal is unavailable (i.e., during the 2 ms pulse period) does not adversely affect the regulation of the output voltage Vout.

The various voltage values and time durations illustrated in FIGS. 3a-3d are purely exemplary in nature, and any other appropriate voltage values and time durations may also be used in other embodiments.

In an embodiment, in one or more of FIGS. 3a-3d, the feedback controller 230 takes one or more appropriate actions based on detecting the fault at time t1. For example, the feedback controller 230 may wait for some time (e.g., for a threshold duration) to see if the fault persists. The feedback controller 230 may also regulate the power supply to the transformer 212 by, for example, turning off the MOSFET 238 (so that no or less power is transferred from the primary to secondary time) for a given duration of time and/or until the fault condition is cleared (or until a user of the system 200a manually resets a fault condition flag). Thus, the feedback controller 230 may at least partially disable the AC-DC convertor system 200a until the fault is cleared. The feedback controller 230 may also provide a notification (e.g., through a fault indication light, alarm, etc.) to a user of the system 200a about the fault.

Thus, in the systems 200a and 200b of FIGS. 2a and 2b, both voltage and current signals are fed back to the feedback controller 230. Unlike the system 100c of FIG. 1c (in which two optocouplers 144 and 154 are used), the systems 200a and 200b use only one optocoupler for both voltage and current feedback. Using a single optocoupler in systems 200a and 200b may result in considerable cost savings and greater reliability (as lower number of optocouplers may result in relatively less chance of failure) compared to the system 100c of FIG. 1c.

Figure 4:
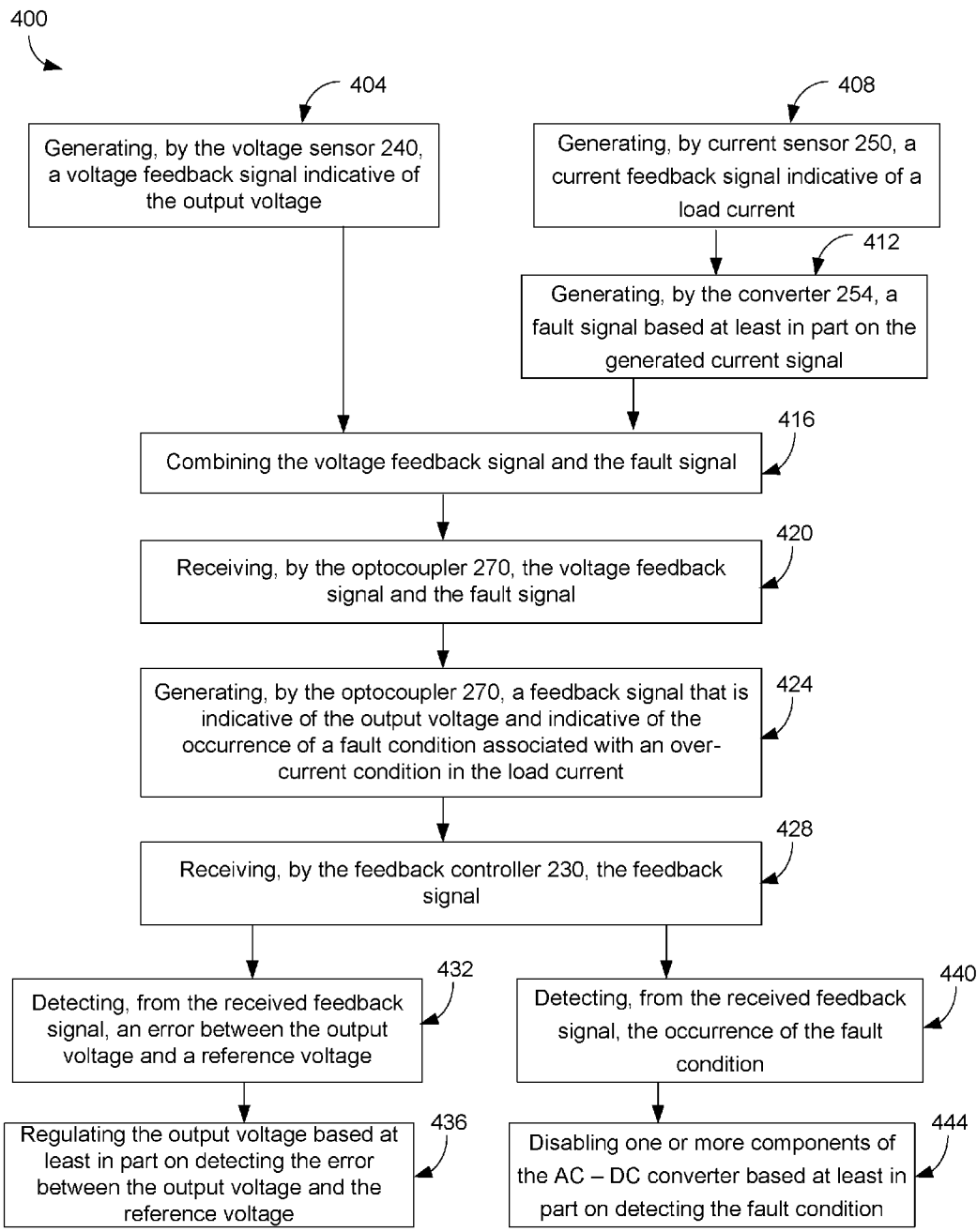
FIG. 4 illustrates an exemplary method for operating the AC-DC converters and of FIGS. 2a and 2b, respectively.

FIG. 4 illustrates an exemplary method 400 for operating the AC-DC converters 200a and 200b of FIGS. 2a and 2b, respectively. Referring to FIGS. 2a, 2b and 4, at block 404, the voltage sensor 240 generates a voltage feedback signal indicative of the output voltage Vout of the converter. At block 408, the current sensor 250 generates a current feedback signal indicative of a load current in the secondary side of the converter. The converter generates a fault signal based at least in part on the generated current signal, block 412.

At block 416, the voltage feedback signal and the fault signal are combined. The optocoupler 270 receives, at block 420, the combined voltage feedback signal and the fault signal. At block 424, the optocoupler 270 generates a feedback signal that is indicative of the output voltage and indicative of the occurrence of a fault condition associated with an over-current condition in the load current. The feedback signal is received, at block 428, by the feedback controller.

The method 400 further includes, at block 432, the controller 230 detecting (e.g., using filter 273b) from the received feedback signal, an error between the output voltage Vout and the reference voltage Vref. At block 432, the controller 230 regulates (e.g., using the voltage feedback module 246) the output voltage based at least in part on detecting the error between the output voltage and the reference voltage. Such regulation may be performed by controlling a switching circuit (e.g., the MOSFET 238) that controls transfer of energy from the primary side coil to the secondary side coil of the transformer 212.

In the case where a fault occurs, the method 400 further includes, at block 440, the controller 230 detecting (e.g., using detector 274a), from the received feedback signal, the occurrence of the fault condition. At block 444, the controller 230 disables (e.g., using the current feedback module 256) one or more components of the AC-DC converter based at least in part on detecting the fault condition. For example, the current feedback module 256 may control the MOSFET 238 such that transfer of energy from the primary side coil to the secondary side coil of the transformer 212 is disabled (i.e., conversion of AC power to DC power is disabled) until the fault condition is cleared.

Although specific embodiments have been illustrated and described herein, a wide variety of alternate and/or equivalent implementations may be substituted for the specific embodiment illustrated and described without departing from the scope of the present disclosure. This present disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware. This application is intended to cover any adaptations or variations of the embodiment discussed herein.

What is claimed is:

1. An apparatus comprising:
    a voltage sensor circuit configured to generate a voltage feedback signal that is indicative of an output voltage of the apparatus;
    a current sensor circuit configured to generate a current feedback signal that is indicative of a load current of the apparatus;
    a converter configured to receive the current feedback signal, and
generate a fault signal that is indicative of a fault condition associated with the load current of the apparatus; and an optocoupler configured to
simultaneously receive each of (i) the voltage feedback signal and (ii) the fault signal, and
in response to simultaneously receiving (i) the voltage feedback signal and (ii) the fault signal, generate a feedback signal that is simultaneously indicative of both (i) the output voltage of the apparatus and (ii) the fault condition associated with the load current of the apparatus.

2. The apparatus of claim 1, further comprising a feedback controller configured to:
receive the feedback signal from the optocoupler;
detect, from the received feedback signal, an error between (i) the output voltage and (ii) a reference voltage; and
detect, from the received feedback signal, the fault condition.

3. The apparatus of claim 2, wherein the feedback controller is further configured to:
regulate the output voltage based at least in part on detecting the error between (i) the output voltage and (ii) the reference voltage; and
disable one or more components of the apparatus based at least in part on detecting the fault condition.

4. The apparatus of claim 2, wherein the feedback controller comprises:
a detector configured to detect, from the received feedback signal, the fault condition; and
a filter configured to:
filter out the fault signal from the received feedback signal, and
detect, from the filtered feedback signal, the error between (i) the output voltage and (ii) the reference voltage.

5. The apparatus of claim 4, wherein the feedback controller further comprises:
a voltage feedback module configured to regulate, based at least in part on the detected error, the output voltage by controlling a voltage control circuit.

6. The apparatus of claim 4, wherein the feedback controller further comprises:
a current feedback module configured to disable, based at least in part on the detected fault condition, one or more components of the apparatus.

7. The apparatus of claim 1, wherein:
the fault signal has (i) a no-fault state and (ii) a fault state; and
the converter is configured to
detect occurrence of a fault based at least in part on receiving the current feedback signal, and
transition the fault signal from the no-fault state to the fault state upon detecting the occurrence of the fault.

8. The apparatus of claim 7, wherein the converter is further configured to detect the occurrence of a fault based at least in part on the current feedback signal indicating that the load current exceeds a threshold current value.

9. The apparatus of claim 7, wherein:
the combined output of (i) the voltage sensor and (ii) the converter forms an input signal to the optocoupler; and
the converter is further configured to periodically pull the input signal to zero based at least in part on detecting the fault.

10. The apparatus of claim 7, wherein:
the combined output of (i) the voltage sensor and (ii) the converter forms an input signal to the optocoupler; and
the converter is further configured to pull the input signal to a high value based at least in part on detecting the fault.

11. A method comprising:
generating a voltage feedback signal indicative of an output voltage of an alternating current (AC) to direct current (DC) converter;
generating a current feedback signal indicative of a load current of the converter;
based at least in part on the generated current signal, generating a fault signal, the fault signal being indicative of occurrence of a fault condition associated with the load current;
simultaneously receiving, by an optocoupler, each of (i) the voltage feedback signal and (ii) the fault signal; and
in response to simultaneously receiving (i) the voltage feedback signal and (ii) the fault signal, generating, by the optocoupler, a feedback signal based at least in part on (i) the voltage feedback signal and (ii) the fault signal.

12. The method of claim 11, wherein the generated feedback signal is simultaneously indicative of (i) the output voltage and (ii) occurrence of the fault condition.

13. The method of claim 11, further comprising:
receiving, by a feedback controller, the feedback signal from the optocoupler;
detecting, from the received feedback signal, an error between (i) the output voltage and (ii) a reference voltage; and
detecting, from the feedback signal, the occurrence of the fault condition.

14. The method of claim 13, further comprising:
regulating the output voltage based at least in part on detecting the error between (i) the output voltage and (ii) the reference voltage; and
disabling one or more components of the AC-DC converter based at least in part on detecting the fault condition.

15. The method of claim 11, wherein the fault signal has (i) a no-fault state and (ii) a fault state, wherein generating the fault signal further comprises:
detecting, from the current feedback signal, an over-current condition in the load current;
detecting the occurrence of the fault based at least in part on detecting the over-current condition; and
transitioning the fault signal from the no-fault state to the fault state upon detecting the occurrence of the fault.

16. The method of claim 15, wherein transitioning the fault signal from the no-fault state to the fault state further comprises:
periodically pulling a combination of the fault signal and the voltage feedback signal to zero.

* * * * *